Oct. 7, 1924.
R. S. TROTT
1,510,751
SHOCK SPRING MOUNTING
Filed March 19, 1915    2 Sheets-Sheet 1
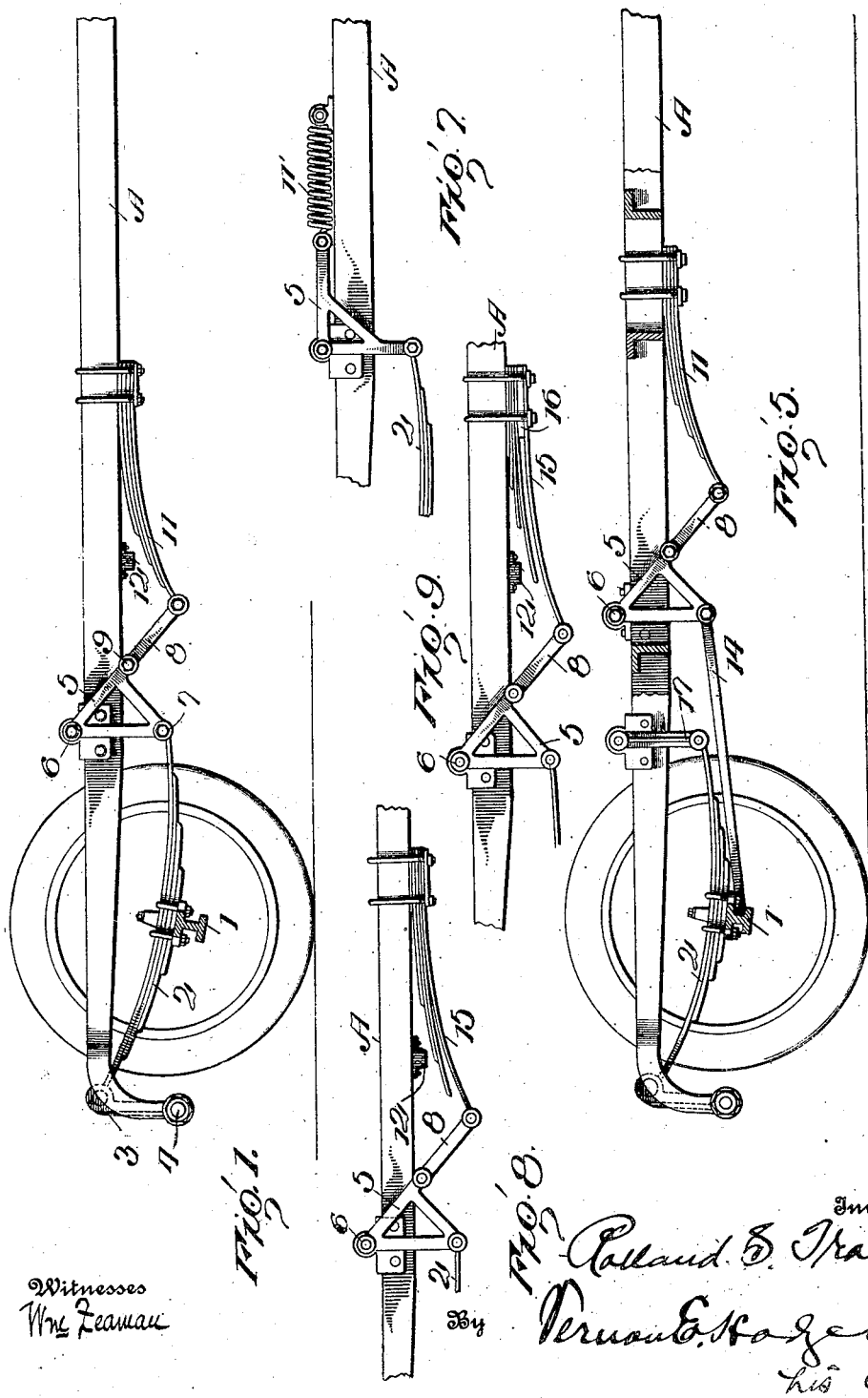

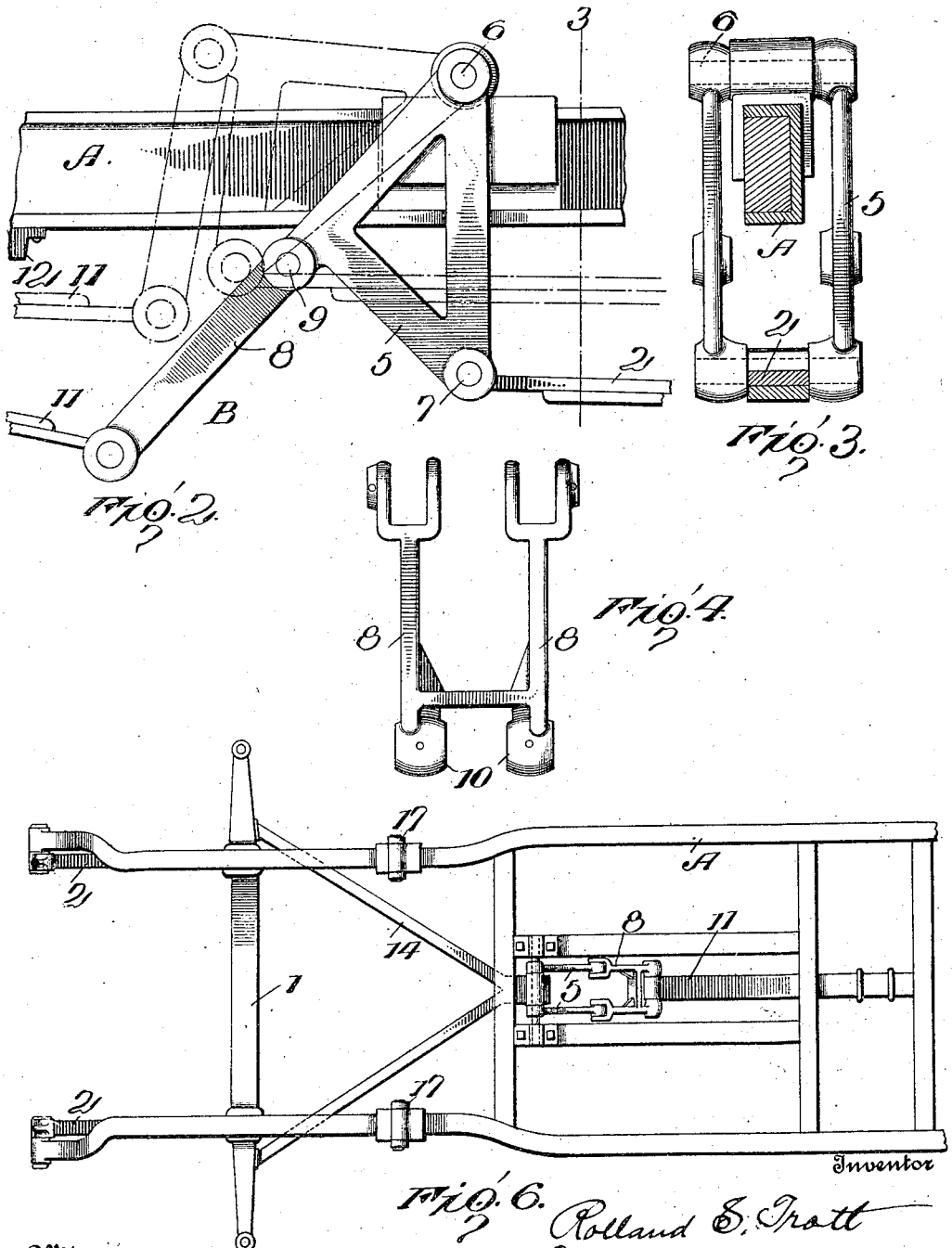

Patented Oct. 7, 1924.

1,510,751

UNITED STATES PATENT OFFICE.

ROLLAND S. TROTT, OF DENVER, COLORADO.

SHOCK-SPRING MOUNTING.

Application filed March 19, 1915. Serial No. 15,608.

*To all whom it may concern:*

Be it known that I, ROLLAND S. TROTT, a citizen of the United States, residing in the city and county of Denver and State of Colorado, have invented certain new and useful Improvements in Shock-Spring Mountings, of which the following is a specification.

My invention relates to an improvement in a shock spring mounting.

The problem with all vehicle-springs is to make them sufficiently strong for the heaviest loads and still flexible enough for the very light loads, and the desideratum is to obtain a mounting that will act easily with the small bumps and stiffly for the larger ones. What is required is a free and easy movement of the axle for the first inch or two of backward action, so as to give the required fine effect on the small bumps of a smooth road, and then get an increasingly strong buffer effect for the bad bumps. It is my aim to provide means whereby the front axle can move back without a particle of vertical movement to the vehicle body, that is to say, means is provided so that the two movements are now independent, as they should be.

It has been found that the horizontal components of the road shocks increase as the square of the speed of the vehicle. This means that the spring that opposes this shock must stiffen up proportionately as its bending is increased. If a spring is mounted ordinarily, of sufficient strength to oppose the greatest obstacles struck at the highest speeds at which they may be encountered, it will be much too stiff and strong to give easy, resilient resistance to the much smaller horizontal components met with on fairly smooth roads and at lower speed.

The object of my present invention is to provide a suitable resilient opposition to the horizontal movement of the axle of a vehicle. Another object is to provide a mounting in which for the smaller movements the leverage against the shock-spring is formed greater than it is for the larger movements.

Therefore to attain this independence of vertical and horizontal spring action, my present invention consists in a tension or compression link or lever connected to the load spring of a vehicle. It further consists in a lever connected to the load spring of a vehicle and held under tension by a shock spring of suitable type, which acts upon and through the lever to resiliently resist the backward movement of the load spring. It yet further consists in a lever pivotally mounted on the frame of the machine, and in pivotal connection with the load spring mounted on the axle of the vehicle, with the resilient means connected therewith to yieldingly resist the backward tendency of the axle. The invention further consists in other details of construction which will be hereinafter described and pointed out in the claims.

In the accompanying drawings:—

Figure 1 is a view in side elevation of the forward end of an automobile frame showing the axle slightly inclined;

Figure 2 is an enlarged view of the lever and toggle link, showing a fragmentary portion of the vehicle frame and the connection of the lever and toggle link with the load and shock springs respectively;

Figure 3 is a transverse section taken on the line 3—3 of Figure 2;

Figure 4 is a front view of one of the toggle links;

Figure 5 is a longitudinal sectional view showing a form of construction in which a radius rod or reach is used for keeping the axle square instead of the cross-shaft as shown in Figure 1;

Figure 6 is a plan view of the construction shown in Figure 5;

Figure 7 illustrates another form of compression link and shock spring connection;

Figures 8 and 9 show means for weakening the first effect of the shock spring, while retaining the same final maximum effect.

A, represents the frame of the vehicle, and 1 is the forward axle. This is preferably set obliquely as shown in Figure 1, and the load spring 2 is secured thereto in the usual manner, with its forward end connected with the tension link 3 upstanding from a cross-shaft 4, upon which the corresponding link on the other side (not shown) is secured.

A compression link 5, which may be of the bell crank lever form, but which might be variously constructed, is pivotally mounted by means of a pin 6 upon the frame. The rear end of the forward spring 2 is connected to one end of this lever 5, as at 7, and a toggle link 8 is pivotally connected at another point 9 at one end, and at its other end 10 to the shock springs 11.

The two ends of the toggle link 8 should normally be in line with the pivot-point of the bell-crank lever or link 5 on the frame as shown, and by this construction the central position of the axle corresponds to the position of the bell-crank lever when the toggle link is in line with the frame pivot. Either backward or forward movement of the axle from this central position swings this toggle link over the dead center, as it were, as shown in dotted lines in Figure 2, allowing the maximum of horizontal axial movement with the minimum take up on the shock springs, as the dotted lines in that figure indicate. The greater the movement, the more direct is the pull of the toggle link on the shock springs, and by the proper proportioning of the toggle link length as well as the distance from the frame pivot at which it is attached to the bell crank lever, a wide range of results may be obtained to suit different conditions.

The preferred form is to connect the bell-crank to the axle through the medium of the load spring itself so that the bell crank lever supports one end of the load spring, as shown in Figure 1. In this case, the other end of the spring should be mounted with the reverse type of link, as illustrated, so that the weight of the car will not affect the horizontal positioning of the axle.

A leaf shock spring is preferred, as it allows the use of an added device for supporting the horizontal axle movement resiliently, even on the hardest bumps, that is to say the rubber buffer 12, which is placed beneath the frame and above the shock spring so that the shock spring strikes the buffer on the very hardest bumps. This constitutes the cushion of the shock spring, but it is very resilient, not only because the rubber is resilient, but also because the end of the spring beyond the rubber buffer still acts as a spring, but owing to the fact that when it shall have struck the rubber buffer, it is so greatly shortened, that it has become correspondingly stiffened in its effect.

Notwithstanding the fact that the leaf spring may in most instances be preferable, still it is possible to use some other form of spring, for instance the helical spring 11', as shown in Figure 7, in which event the toggle link may be omitted, and the link or lever 5 used alone, its lower end being connected with the rear end of the forward spring 2.

Other means than the cross-shaft 4 might be employed for keeping the axle square, such for instance as the reach or radius rod 14, as shown in Figures 5 and 6, in which event this extends from the axle to the center of the frame where the lever 5 is mounted instead of at the sides of the frame, as previously described, and the load-spring 11 and toggle link 8 are correspondingly mounted.

The rubber buffer 12 might be either mounted on the frame, or on the shock spring, and in lieu thereof an extra spring might be employed either spiral or flat leaf as preferred, its function being simply to guard against the very greatest possible shocks.

As a means for providing for the rear movement for the very small bumps and shocks without weakening the strength of the shock spring for the big bumps, I propose to construct the shock spring in some such way as illustrated in Figures 8 and 9, in which the master-leaf 15 in the form shown in Figure 8 is curved down a little more than the other leaves. By making the shock springs in this manner, the strength of the shock spring is again multiplied by the amount of movement in addition to the multiplying done by the link or lever 5 and toggle link mounting 8. Thus easier movement for the very small bumps is provided without weakening the strength of the shock springs for the big bumps in the slightest.

Another way of doing this would be as illustrated in Figure 9, in which a thin plate 16 is inserted at the spring seat between the master leaf of the shock spring and the supporting leaves. This makes the master-leaf work alone for the small bumps, and yet come right up against the full strength of the spring on the heavier shocks. At the same time, the master leaf is in no danger of breaking, because of the lack of all rebound due to its mounting, for in this mounting it will be observed that the shock spring is subject to a peculiar condition, which is that no rebound is ever possible. It can never rebound back past its normal position when the axle is central. So regardless of the severity of the shock, it is unnecessary to figure for rebound strains for shock springs. With ordinary shock springs, it is the rebound that breaks the springs, unless clips are used to tie the master-leaves to some of the supporting or shorter leaves for strength against the rebound, but that condition can never arise in the present shock spring mounting.

This mounting is equally applicable to the rear axle. Likewise the compression links may be on the cross-shaft and the bell-crank may be in tension, or the mounting may be as shown, but with the cross-shaft at 6 on the bell-crank lever 5. Also roller or slide connections may be used between the load springs and the frame.

But these changes do not depart from the essential operation shown, and I do not limit myself for that reason to the exact construction disclosed.

I claim:

1. A shock spring mounting including a frame, an axle, a shock spring for resiliently opposing horizontal movement of the axle, a lever pivoted on the frame, a member attached to the axle and pivotally connected to the lever, and a toggle-link connecting the shock-spring and lever normally in line with the pivot of the lever on the frame, and arranged so as to resist horizontal movement of the axle.

2. A shock spring mounting including a frame, an axle, a shock spring which is normally unloaded under a tension whose minimum is fixed for resilently opposing the horizontal movement of the axle, a lever pivoted on the frame, a member attached to the axle and pivotally connected with the lever, and a toggle link connecting the shock spring lever and normally in line with the pivot of the lever on the frame, and arranged so as to resist horizontal movement of the axle.

3. A shock spring mounting including a frame, a horizontally movable axle, a load spring connected with the axle, a tension link at one end of the load spring, a compression link connected with the other end of the load spring, and a shock spring normally unloaded under tension, said shock spring mounted on the frame and means connecting the shock spring with the axle.

4. A shock spring mounting comprising a frame, an axle, a load spring connected with the axle, a tension link at one end of the load spring, a compression link connected with the other end of the load spring, a shock spring mounted on the frame, and connecting means including a toggle link extending from the shock spring to the axle to operate said shock spring in step with the angular movement of said compression link.

5. A shock spring mounting comprising a horizontally movable axle, a frame, a shock spring normally unloaded and mounted on the frame, a lever pivoted on the frame and connected with the axle, and a toggle link connecting the shock spring and the lever and normally in line with the pivot of the lever.

6. In a vehicle with a resiliently opposed horizontally movable axle, means for maintaining the latter square with the line of draft, and means normally practically unloaded and including a toggle link connection for resiliently opposing the horizontal movement of the axle and frame with respect to each other, which resistance commences at minimum and increases to maximum with decreasing purchase against the shock spring as the force of the horizontal shock increases.

7. The combination with a frame, a horizontally movable axle, load springs connecting the frame and axle movably together, shock springs normally unloaded under tension for resisting horizontal movement of frame and axle with respect to each other, and connecting means including a toggle link between the axle and the shock springs which decrease the purchase against said shock springs from practically zero to the full strength of the springs.

8. The combination with a frame, a horizontally movable axle, and load springs connected with the axle, of springs normally unloaded under tension, and means including links normally preferably on center connecting the shock springs to the axle.

9. A shock spring mounting comprising a horizontally movable axle, a frame, a link pivoted on the frame and downwardly depending therefrom and pivotally connected with the axle, a shock spring normally unloaded under tension connected with the frame, and means connecting said spring to said link to automatically apply greater or less purchase against said spring according to the amount of the horizontal shock upon the axle.

10. A shock spring mounting comprising a frame, a horizontally movable axle, a lever connected with both, and a shock spring normally unloaded under tension comprising a plurality of leaves secured to the frame, the outer ends of which are normally out of contact with each other, and one of said leaves connected to the lever.

11. A shock spring mounting comprising a frame, a horizontally movable axle, a load spring secured to the axle and connected with the frame, a lever supported on the frame and pivotally connected with the load spring, a shock spring secured to the frame and comprising a plurality of leaves, the outer ends of which are suitably separated, so that tension due to horizontal shock upon the axle is borne by one or more of said leaves according to the intensity of the shock, and means including a toggle link connecting the shock spring with the axle.

12. The combination with a frame, a horizontally movable axle, load springs, and means including links normally on center connecting the load springs with the frame to allow movement of the axle with the frame, means to maintain the axle at right-angles to the line of draft, shock springs normally unloaded under tension for offering resistance to the horizontal movement of the axle so arranged that there is a large purchase against the shock spring at the start, which decreases and strengthens the resistance to the horizontal axle movement as the linkage gets off center.

13. In a shock spring mounting, a shock-spring, a rotatable member, means mounting said shock-spring and said member, and means connecting said spring and said member, normally on center, and tending to approach a pull on said spring that is tangent to its line of action, as said member is turned in one direction.

14. In a shock spring mounting, a shock spring, a fulcrum, means mounting said spring and said fulcrum, a member pivotally mounted upon said fulcrum, means connected to said member tending to revolve the same, and means connecting said member and said spring in substantial alignment with said fulcrum and connections in the normal position of said member.

15. In a shock spring mounting, a shock spring, a pivotal member, means mounting said spring and said member, means connected to said member and to said spring and tending to assume a position in alignment with said connections with the normal position of said pivotal member, and an operative connection between the shock spring and the running gear.

16. In a shock spring mounting, a shock spring, a pivotal member, means connecting said member and said spring, the connections being in substantial alignment with the pivotal point of said member, and means for rotating the member.

17. In a shock spring mounting, a shock spring whose spring eye moves upwardly substantially in the arc of a circle, a revolvable member, means mounting said spring and said member, means connected to said member able to revolve same, and means connected to said member and said spring tending to assume a position approximately tangent to said arc of movement of the spring eye with the maximum rotation of said member in one direction.

In testimony whereof I affix my signature in the presence of two witnesses.

ROLLAND S. TROTT.

Witnesses:
ERNEST M. WHITE,
ALBERT R. BURGHARDT.